United States Patent [19]
Scott

[11] 4,260,475
[45] Apr. 7, 1981

[54] HYDROCARBON CRACKING PROCESS

[75] Inventor: John W. Scott, Ross, Calif.

[73] Assignee: Chevron Research Company, San Francisco, Calif.

[21] Appl. No.: 90,221

[22] Filed: Nov. 1, 1979

[51] Int. Cl.³ .............................................. C10G 11/18
[52] U.S. Cl. .................................. 208/113; 208/164; 252/417
[58] Field of Search ............... 208/126, 120, 113, 155, 208/164; 252/417

[56] References Cited
U.S. PATENT DOCUMENTS

| | | | |
|---|---|---|---|
| 2,613,173 | 10/1952 | Kaasa | 208/164 |
| 2,788,311 | 4/1957 | Howard et al. | 208/164 |
| 2,929,774 | 3/1960 | Smith | 208/147 |
| 3,494,858 | 2/1970 | Luckenbach | 208/164 |
| 3,767,566 | 10/1973 | Cartmell | 208/164 |
| 4,118,338 | 10/1978 | Gross et al. | 208/164 |

Primary Examiner—Delbert E. Gantz
Assistant Examiner—G. E. Schmitkons
Attorney, Agent, or Firm—D. A. Newell; W. H. Hooper; W. D. Reese

[57] ABSTRACT

A process for cracking hydrocarbons is disclosed in which catalyst particles are regenerated in two stages, the first employing an entrained bed of upwardly moving catalyst in cocurrent flow with regeneration gas, and the second employing a fluidized bed of catalyst in net downward movement countercurrent to regeneration gases.

3 Claims, 1 Drawing Figure

U.S. Patent     Apr. 7, 1981     4,260,475
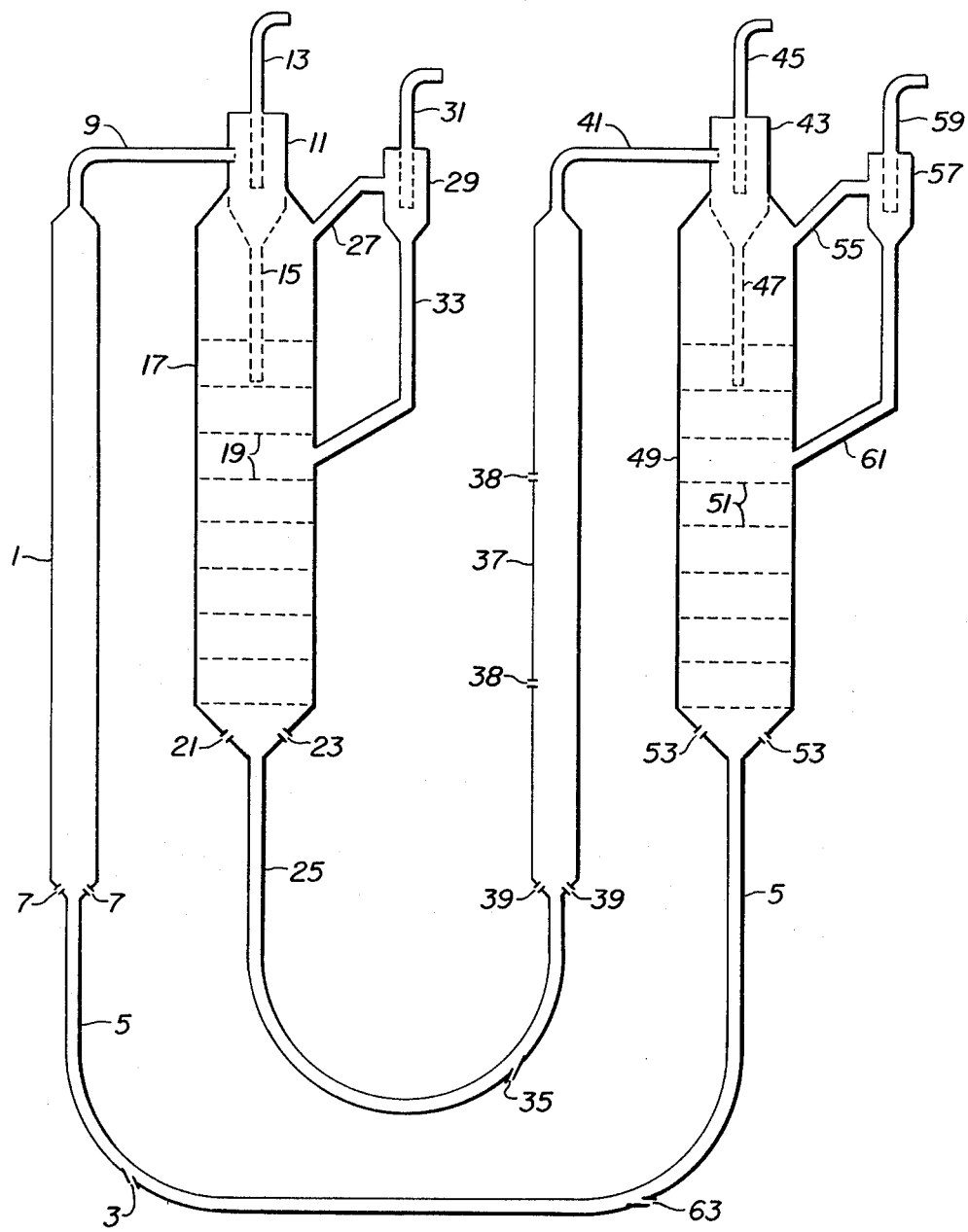

HYDROCARBON CRACKING PROCESS

BACKGROUND OF THE INVENTION

The present invention relates to a process for catalytic cracking of hydrocarbons, in which two stages of catalyst regeneration are employed. In one aspect, the present invention concerns a process for catalytic cracking of heavy hydrocarbon stocks, such as petroleum residuals, and regenerating spent catalyst containing a substantial coke concentration.

Conventional hydrocarbon cracking operations employ moving beds or fluidized beds of catalyst. Catalytic cracking is carried out in the absence of externally supplied molecular hydrogen and without substantial hydrogen consumption, as distinguished from hydrocracking. In catalytic cracking, an inventory of particulate catalyst is continuously cycled between a cracking reaction step and a catalyst regeneration step. In conventional fluidized catalytic cracking (FCC) systems, a stream of fluidized catalyst particles is contacted with a hydrocarbon feed in a cracking zone or reactor at a temperature of about 425–600° C., usually about 460–560° C. Cracking of hydrocarbons at the elevated operating temperature results in deposition of carbonaceous coke on the catalyst particles. The fluid products resulting from the cracking step are separated from the coke-deactivated, spent catalyst particles, and the products are recovered. Spent catalyst is stripped of volatiles, usually with steam, and passed to a catalyst regenerator. To regenerate the catalyst, it is conventionally contacted with a predetermined amount of molecular oxygen in a fluidized bed. A desired portion of the coke is burned off the catalyst, restoring the activity of the catalyst and heating it to an elevated temperature, e.g., 540–815° C., usually 590–730° C. Flue gas formed by combustion of coke during regeneration may be treated for removal of particulates and conversion of carbon monoxide to carbon dioxide, after which the flue gas is normally discharged into the atmosphere.

Commercial FCC feeds are typically gas-oils boiling in the range from about 221–400° C. In a few cases, heavier feeds are used, usually mixed with at least some gas-oil. Heavier fractions, such as atmospheric and vacuum residual stocks, are relatively abundant and inexpensive. When the supply of gas-oil FCC feeds is low, use of heavy residual fractions for FCC conversion is particularly advantageous. The term "residual petroleum fraction", as used herein, may be defined as a fraction of petroleum boiling above about 400° C., although the overhead from vacuum distillation may have a boiling point up to about 570° C.

Residual petroleum fractions usually contain metals such as nickel, vanadium and iron. Residual fractions also typically contain heat-sensitive and non-distillable components, such as asphaltenes, which tend to form coke and hydrogen when heated. The presence of metals and asphaltenes makes residual fractions relatively difficult to process in conventional FCC systems. Metals tend to accumulate on the cracking catalyst and adversely affect the selectivity of the catalyst, with a resulting increase in coke and hydrogen yield. Asphaltenes likewise tend to form coke and hydrogen upon breakdown during the cracking operation. Large coke and hydrogen yeidls are quite undesirable. The selectivity of feed conversion to desired products is an important economic parameter in FCC operations. The primary desired product is a naphtha fraction, approximately a 24–220° C. cut, while coke and hydrogen are primarily undesired by-products. Thus, processing of residual feeds presents a problem of a cumulative effect on the amount of coke generated on the catalyst due to the metals and asphaltenes.

Formation of a certain amount of coke during the cracking step is necessary to supply process heat. On the other hand, when the amount of coke necessary to supply heat has been burned off the catalyst, the concentration of coke on the regenerated catalyst must be low enough so that the catalyst is active. When the amount of coke on the spent catalyst substantially exceeds the amount of coke needed to maintain the cracking unit in heat balance, it is difficult, in conventional processing systems, to burn off all the excess coke and dispose of the resulting heat energy. Riser-type (entrained catalyst bed) cracking has been suggested for processing residual feeds, to shorten the catalyst-oil contact time and thereby reduce coke make. Usually, riser cracking only partially solves the problem of excessive coke formation. Prior hydrogen processing of cracking feeds to convert heat-sensitive, coke-forming components of the feed before catalytic cracking has also been suggested, both for demetallation and for converting asphaltenes. The benefits of prior hydrogen treatment are often at least partially offset by the attendant expense.

In regenerating heavily coked spent catalyst, it can be difficult to burn off enough coke to provide a suitably low concentration of carbon on regenerated catalyst. In general, a relatively low concentration of carbon on regenerated catalyst is advantageous to a cracking operation, since a low level of carbon on regenerated catalyst normally provides a more selective, active catalyst, particularly for catalysts containing a zeolite cracking component. Conventional cracking catalyst regeneration is typically carried out in a single-stage operation, using a dense-phase fluidized bed of catalyst particles. Some conventional, single-stage regeneration systems regenerate catalysts in an incomplete carbon monoxide combustion mode, which usually leaves a relatively high concentration of carbon on the regenerated catalyst generally more than 0.2 weight percent, and often about 0.25 to about 0.45 weight percent. Flue gas removed from cracking catalyst regenerators operating in an incomplete combustion mode is characterized by relatively low carbon dioxide/carbon monoxide volume ratio. The amount of oxygen introduced into a catalyst regenerator operating in an incomplete combustion mode must usually be carefully limited in order to prevent afterburning, combustion of carbon monoxide in the flue gas downstream of the dense bed of catalyst in the regenerator, which can result in overheating of the flue gas. Typically, the carbon monoxide is burned in a boiler to dispose of it before discharging the flue gas. Other conventional cracking systems regenerate catalyst in a complete carbon monoxide combustion mode, in which carbon monoxide and coke are essentially completely burned in a single stage of regeneration, carbon monoxide combustion being promoted either thermally or by an active combustion-promoting metal circulated with the cracking catalyst.

In a few cases, plural stages of catalyst regeneration have been suggested in the cracking art. For example, U.S. Pat. No. 3,494,858 describes partial regeneration of catalyst in a first fluidized bed, using flue gas produced by a second-stage, transfer line regeneration. U.S. Pat.

No. 3,767,566 also shows plural regeneration stages, with a first regeneration stage using a dilute fluidized catalyst phase and flue gas from a second regeneration stage, the second stage using a dense fluidized catalyst phase. Use of riser-type regenerators has been suggested in U.S. Pat. No. 2,929,774, in connection with a countercurrent contact cracking reactor.

SUMMARY OF THE INVENTION

In an embodiment, the present invention concerns a process for cracking hydrocarbons, which comprises: contacting the hydrocarbons with particulate solids in a cracking zone in the absence of externally supplied molecular hydrogen at cracking conditions including a temperature in the range from about 425° C. to about 700° C., whereby coke is deposited on the particulate solids, withdrawing coke-containing particulate solids and cracked hydrocarbons from the cracking zone; introducing coke-containing particulate solids and a first gas stream into a lower portion of a generally vertically extending first regeneration zone, entraining particulate solids upwardly through the first regeneration zone in the first gas stream, burning a first portion of coke off entrained particulate solids with molecular oxygen and entrained-bed regeneration conditions in the first gas stream, removing the particulate solids and the first gas stream from an upper portion of the first regeneration zone; and passing the particulate solids from the first regeneration zone into an upper portion of a vertically elongated second regeneration zone, fluidizing the particulate solids by passing a second gas stream upwardly through the second regeneration zone, passing fluidized particulate solids downwardly through the second regeneration zone while substantially restricting gross back-mixing of fluidized particulate solids, burning a second portion of coke off the fluidized particulate solids with molecular oxygen at fluid-bed regeneration conditions in the second gas stream, removing the second gas stream from the upper portion of the second regeneration zone, and removing the particulate solids from a lower portion of the second regeneration zone.

I have found that cracking catalyst contaminated with a high coke concentration as a result of cracking high-boiling feeds such as residuals, can advantageously be regenerated to a very low carbon content by a two-stage regeneration operation. In the first stage, a portion of the coke is burned with molecular oxygen in an upwardly flowing gas stream in which the catalyst particles are entrained in cocurrent flow. In the second stage of regeneration, a second portion of coke is burned off the catalyst with molecular oxygen contained in an upwardly flowing gas, while the catalyst particles move downwardly in a fluidized state with substantially restricted backmixing.

DESCRIPTION OF THE DRAWING

The attached drawing is a schematic illustration of a preferred embodiment of the present invention.

Referring to the drawing, there is shown a cracking system including a riser-reactor 1. Hydrocarbon feed, introduced through a conduit 3, and particulate catalyst are passed into the reactor 1 from transfer line 5. Gases in the reactor 1 flow upwardly, entraining the catalyst particles. Gas flow is augmented, as needed, by steam introduced into the bottom end of the reactor 1 through a port 7. Cracking reactions in the riser 1 form hydrocarbon cracking products and deposit coke on the catalyst particles. The fluid cracking products and spent catalyst particles are passed from the riser 1 through a transfer line 9 into a cyclone separator 11. Gases and vapors flow into a conduit 13 and are withdrawn from the cracking operation for further separation and purification by conventional means not shown. Coke-contaminated, spent catalyst particles flow downwardly through a dipleg 15 into a stripper-gasifier vessel 17. The stripper 17 is equipped with a plurality of vertically spaced, perforated plates 19, which act to prevent substantial, gross back-mixing of catalyst particles and prevent slugging in the vessel 17. Steam and molecular oxygen are introduced into the bottom of the vessel 17 through inlets 21 and 23. The rate of flow of the gases upwardly through the vessel 17 is adjusted to provide a fluidized bed of catalyst particles. Volatile hydrocarbons present in the spent catalyst particles are stripped off the catalyst by the upwardly flowing gases in the vessel 17, and steam and oxygen react with coke and hydrocarbons to form hydrogen and carbon monoxide. The mixture of hydrogen, carbon monoxide and hydrocarbons is removed from the upper end of the stripper 17 through a conduit 27 and is passed into a cyclone separator 29. Gases and vapors are removed through a conduit 31 and are withdrawn from the process for purification, upgrading and use, by means not shown. Any particulate solids entrained in the stripper effluent fluids are returned to the stripper from the cyclone 29 through a conduit 33. Catalyst particles are continuously removed from the bottom of the stripper 17, into a conduit 25, resulting in continuous downward movement of fluidized catalyst particles in the stripper. A gas stream containing a controlled concentration of molecular oxygen is introduced into the conduit 25 via a conduit 35, and, according to the invention, the catalyst and oxygen are passed into a riser regenerator 37. An upward gas flow rate in the riser 37 is adjusted so that the catalyst particles are entrained upwardly through the riser, with steam being added as necessary through inlets 39 to provide entrainment. Part of the coke is burned off the catalyst particles as they pass upwardly through the riser-regenerator 37. Gas comprising molecular oxygen is added to the upwardly flowing gases through inlets 38 at a plurality of vertically spaced levels of the vessel 37. Flue gas containing a substantial concentration of carbon monoxide and a relatively low carbon dioxide/carbon monoxide volume ratio and partially regenerated catalyst are removed from the top of the riser 37 through a conduit 41 and are passed into a cyclone separator 43. Flue gas is separated and removed from the cyclone 43 through a conduit 45 and is withdrawn from the operation for use as an industrial fuel gas. Further according to the invention, catalyst particles are passed downwardly through a dipleg 47 into the upper portion of a vertically elongated countercurrent flow regeneration vessel 49. The regenerator 49 is equipped with a plurality of vertically spaced, perforated plates 51, which act to prevent substantial backmixing of catalyst particles and to prevent slugging in the regenerator 49. A gas stream containing molecular oxygen is introduced into the bottom end of the vessel 49 through an inlet 53, and is passed upwardly through the vessel. The gas flow rate upwardly through the regenerator vessel 49 is adjusted to provide a fluidized bed of catalyst particles in the vessel. Substantially all remaining coke is burned off the catalyst particles in the vessel 49. Flue gas having a relatively high carbon dioxide/carbon monoxide volume ratio is removed from the top of the vessel 49 through a conduit 55. It is separated from any entrained catalyst particles in a cyclone 57 and withdrawn from the operation through a conduit 59 for disposal. The catalyst particles are returned from the cyclone to the vessel 49 through a conduit 61. Various conventional means and operations necessary for carrying out the above-described embodiment, such as controls, valves, compressors, pumps, etc., are not shown or described, as their placement and use will be readily apparent to those skilled in the art.

DETAILED DESCRIPTION OF THE INVENTION

The present invention is used in cracking hydrocarbon feeds. Conventional catalytic cracking feeds typically include hydrocarbons boiling between about 221° and about 400° C. These same hydrocarbon cracking feeds may be processed in a system employing the present invention. Suitable feedstocks include, for example, petroleum distillates or residua, either virgin or partially refined, such as by catalytic hydroprocessing. Conventional gas-oil cuts are thus suitable. Preferred feeds are atmospheric and vacuum residual fractions and so-called synthetic feeds, such as coal oils, bitumen, shale oils, and high-boiling fractions thereof. Suitable feedstocks normally boil in the range from about 221°-600° C. or higher, and preferably include a substantial fraction boiling above 400° C. Preferred feeds used in the present invention may include a substantial concentration of non-distillable or heat sensitive hydrocarbonaceous materials such as asphaltenes. A suitable feedstock may include recycled hydrocarbons which have already been subjected to cracking, such as light, medium and heavy cycle oils, as well as bottoms oils resulting from cracking product fractionation. Optionally, feeds may have previously been treated or refined to remove sulfur, nitrogen or metals, as by hydrodemetallation, hydrodenitrification, or hydrodesulfurization, or the like.

Conversion, or cracking conditions employed in the hydrocarbon cracking step of the present invention may be obtained, in part, by preheating or heat-exchanging a hydrocarbon feed to bring it to a relatively high temperature before it is introduced into the cracking, reaction zone. Preheating, however, is not essential. Cracking, conversion conditions include a temperature in the range from about 425° C. to about 625° C., preferably about 510° C. to about 610° C. Cracking conditions also preferably include a pressure in the range from about atmospheric to about 4 atmospheres or more, particularly preferably about 2 atmospheres to about 3 atmospheres. In cracking using a fluidizied bed of particulates, a catalyst/hydrocarbon weight ratio of about 3 to about 10 is usually quite suitable. A hydrocarbon weight hourly space velocity in the cracking operation of about 5 to about 50 per hour is preferably used. The spent catalyst, or spent particulate solids, after contact with hydrocarbons in the cracking zone, preferably contains about 0.5 weight percent to about 10 weight percent coke. Particularly, preferably the particles contain about 1% to about 5% coke. The cracking zone employed may be of conventional design and may use dilute-phase fluidized solids contact, riser-type entrained solids contact, dense-bed fluidized solids contact, countercurrent contact, a moving, packed bed of solids or a combination thereof, between the feed hydrocarbons and the catalyst particles. Catalyst fluidization, entrainment, etc. may be assisted by gases such as steam or nitrogen. Conventional spent solids stripping means for removing volatiles from the spent solids may also suitably be employed.

The present process is used for cracking hydrocarbons with particulate solids. The particulate solids may optionally be catalytically active or may simply act as a heat carrier and sorbent for the hydrocarbons. Essentially, the particulate solids employed must be suitably attrition resistent and refractory to the high temperatures and to steaming which are characteristic of the process, so that the particles can be circulated for a practical period of time in a fluidized system. Conventional particulate cracking catalysts and heat transfer solids can be used in the present process. Suitable cracking catalysts may include a zeolitic crystalline aluminosilicate component. Zeolite-free cracking catalysts are also suitable for use. Catalyst contained a layered, two dimensional clay components are also suitable. Typical of cracking catalysts component which can be employed are: (1) crystalline aluminosilicate such as activated and/or stabilized forms of Zeolite Y, Zeolite X, mordenite, ZSM-5, and the like; (2) natural and synthetic clays, acid-treated and heat-treated clays; (3) non-crystalline and non-zeolitic crystalline forms of inorganic oxides and combinations of inorganic oxides, such as crystalline or amorphous silica, alumina, magnesia, titania, zirconia, etc., especially combined forms of the oxides as silica-alumina and silica-magnesia, and crystalline silica. The preferred particulate solid is a composite of about 5 to 50 weight percent of a rare earth and/or hydrogen exchanged Zeolite Y-type crystalline aluminosilicate associated with a porous inorganic oxide matrix, such as a treated clay or synthetic amorphous silica-alumina cogel.

Particulate solids other than active, acidic cracking catalyst may alternatively or additionally be circulated in the cracking system. For example, alumina particles may be included in the particulate solids inventory to help control sulfur oxides as discussed in U.S. Pat. No. 4,071,436, and/or particles containing a highly active combustion promoting metal, such as a Group VIII noble metal, may be mixed with the catalyst or heat carrier particles. Likewise, particles having a heat carrying capacity but low intrinsic acidic cracking activity may be circulated either alone or mixed with more active and acidic cracking catalyst to provide heat for either acidic or essentially thermal cracking of the hydrocarbons.

According to the invention, coke containing particles which result from cracking of hydrocarbons are regenerated in two steps: (1) an entrained bed step, in which particles and regeneration gas move in cocurrent, upward flow; and (2) a fluidized bed step, in which particulates and regeneration gas move in generally countercurrent flow.

The first regeneration zone, in which particulates are partially regenerated in entrained flow in upwardly moving gases, may suitably be defined by any vessel, conduit, reactor or the like capable of containing the upwardly moving gases and solids at the temperatures and pressures employed in the first regeneration stage. Riser-type vessels or transfer line vessels of the type used conventionally in carrying out riser-cracking in fluidized catalytic cracking systems are suitable for use as the first regeneration zone in the present process. The vessels or conduit used to provide the riser-type regeneration zone can be sized in length and cross-sectional area to provide the desired gas and solids flow rates and residence times according to conventional design parameters well known to those skilled in the art. The riser-regenerator is preferably equipped with means for introducing molecular oxygen into the entraining gas stream at a plurality of vertically spaced levels in the first regeneration zone.

The second regeneration zone, in which fluidized particulates move generally downwardly, countercurrent to upwardly moving gases, may likewise be defined by any vessel, conduit, reactor or the like capable of containing the fluidized particles in flowing gases at the temperatures and pressures used in the second, fluidized stage of regeneration. Preferably, the second regeneration zone comprises a vertically elongated vessel having a length and diameter suitably adjusted for providing gas and solids residence times and solids fluidization according to the parameters of the process, as more fully discussed below. In order to prevent gross back-mixing of generally downwardly moving particles in the second regeneration stage, the vessel employed should be equipped with some sort of means for impeding back-mixing such as barriers, baffles, solids or gas dispersing means, redistribution means, or the like. For example, perforated plates, bars, screens, packing material, or other suitable internals may be used to impede back-mixing.

Particulates which are to be regenerated according to the present two-stage regeneration process should usually contain at least 0.5 weight percent coke. After catalyst stripping or other volatile stripping, the coke content of particles to be regenerated is preferably between 1 and 10 weight percent. In the first step of the regeneration procedure, coke-containing particulates are passed into the lower end of a generally vertically extending regeneration zone. The particles are entrained upwardly through the regeneration zone and are removed from the upper end of the regeneration zone after a first portion of the coke contained on the particles is burned off the particels with a molecular oxygen present in the entraining stream of gases. Thus, particles withdrawn from the riser regenerator after the first regeneration stage still contain a substantial amount of coke, preferably at least 0.2 weight percent. Particularly preferably, particles contain at least 0.5 weight percent after completion of the first regeneration stage. The riser regeneration conditions used in the upflow regeneration zone preferably include an average temperature of about 500° C. to 1000° C. An average temperature between about 525° C. and 725° C. is particularly preferred. The pressure maintained is not critical, so that lower pressures are preferred for convenience and safety. A pressure of atmospheric to about 5 atmospheres is particularly suitable. The catalyst entrainment-regeneration gas introduced, in addition to the desired amount of molecular oxygen, may include such relatively inert gases as nitrogen, steam, carbon monoxide, carbon diocide, hydrogen, etc. The composition of the entraining gases will, of course, vary along the gas flow path through the regeneration zone, as the gases pass from the upstream end to the downstream end of the riser regenerator. The amount of entraining gas and its pressure and superficial velocity in the riser are maintained at level such that the particulates present in the riser are entrained upwardly through the riser. Preferably, the concentration of molecular oxygen at any vertical level in the first-stage regenerator is relatively low, with additional oxygen being introduced at one or more vertically spaced levels in the path of the entraining gases. A maximum oxygen concentration of 4 volume percent is particularly preferred. A solids residence time in the riser regenerator of about 3 to 6 seconds and a gas residence time of about 2 to 4 seconds are generally suitable. Preferably, when the entraining gas is recovered from the riser regenerator, it has a sufficiently high fuel value to have utility as a fuel gas. The utility of the effluent gas from the riser regenerator as a fuel gas will depend primarily on the carbon monoxide content of the gas. This may vary according to the oxygen and steam partial pressures, the total pressure, the gas and solids residence times and the exact temperature maintained in the riser regenerator. The amount of molecular oxygen (free oxygen) introduced into in the first stage regeneration zone is preferably controlled to provide the desired degree of coke burn off in the entrained bed regenerator, whether all the oxygen is introduced at the downstream end of the regenerator or some is introduced further along the entraining gas path. The entraining gas exiting the first regeneration zone should generally have an oxygen concentration of not more than 0.5 volume percent. Preferably, the effluent gas contains not more than 0.1 volume percent molecular oxygen. Particulate solids removed from the first regeneration zone contain a substantial fraction of residual coke, usually about 0.4 to 1.5 weight percent. Preferably, from 40 to 60 weight percent of the coke originally present on the particles entering the first regeneration zone is removed from the particles during the entrained bed regeneration step. The effluent gas preferably has a carbon dioxide/carbon monoxide volume ratio of less than 1.5, and, particularly preferably less than 1.0. The $CO_2/CO$ ratio can be controlled, at least partially, by limiting the amount of molecular oxygen introduced into the riser-regenerator.

After the partially regenerated particulates have been removed from the riser-regenerator and separated from the entraining gas stream, the particles are subject to a second stage of regeneration in a fluidized bed, wherein the particles moved generally downwardly in countercurrent flow relative to a fluidizing stream of gases. In carrying out the second stage of regeneration, particles are passed into the upper end of a generally vertically extending regeneration zone, in which the particles are fluidized by an upwardly flowing stream of gases. Coke-free, regenerated particles are withdrawn from the lower end of the regeneration zone. The overall movement of particles is from top to bottom, although localized movement of particles in the second stage of regeneration is much more random. For example, localized back-mixing provides good heat transfer and gas-solids contact and is advantageous. Gross, top-to-bottom back-mixing, on the other hand, is substantially restricted, as by including in the interior of the second regeneration zone one or more means for preventing back-mixing, such as fixed internals, free-standing packing material, or the like. Suitable fixed internals include, for example, screens, perforated plates, vertical or horizontal rods, baffles, etc. suitable packing materials include, for example, pall rings and berl saddles.

During the second stage of regeneration, the amount of carbon contained in the particulate solids is reduced to a sufficiently low level so that the activity of the particulate solids is restored to a substantially high level, allowing any cracking catalyst present in the particulate solids to be returned to the cracking step in substantially active form. Preferably, the amount of carbon on the particular solids removed from a second stage of regeneration is less than 0.2 weight percent and especially preferably less than 0.1 weight percent. The amount of molecular oxygen introduced into the second-stage catalyst regenerator is sufficient to burn all the remaining coke off the particulate solids in the regenerator. In order to retain as much heat energy as possible in the circulating particulate solids, it is preferred that carbon monoxide generated in the second regeneration zone is largely converted to carbon dioxide while the fluidizing gases are still in contact with particulate solids in the regenerator. This entails providing at least some excess molecular oxygen in the fluidizing gas stream. Preferably, enough molecular oxygen is introduced so that the effluent gas stream removed from the second stage regeneration zone includes at least 0.5 volume percent molecular oxygen. It is also preferred to burn sufficient carbon monoxide in the second stage regenerator so that the volume ratio of carbon dioxide to carbon monoxide in the effluent gas is at least 5. Particularly preferably, the $CO_2/CO$ ratio in the effluent gas is at least 50.

The following illustrative embodiment describes a preferred embodiment of the present invention.

ILLUSTRATIVE EMBODIMENT

A system like that shown in the attached drawing is used. The hydrocarbon feed is a petroleum residual fraction substantially all of which has a normal boiling point of at least 480° C. The hydrocarbon feed is introduced into a transfer line 5 through the conduit 3 at the rate of 830 barrels per hour. Particulate solids comprising a conventional cracking catalyst are passed through the conduit 5 at the rate of 1,750,000 pounds per hour. The hydrocarbon feed is cracked in the riser reactor 1 at an average temperature of 580° C., a pressure of about 2 atmospheres, a solids residence time of about 3 seconds, a solids/oil weight ratio of about 6, and an oil residence time of about 2 seconds. The processed hydrocarbons are separated from the coke-containing particles in the cyclone 11 and the hydrocarbons are recovered from the operation. The spent particulates, containing about 2 weight percent coke, are introduced through the dipleg 15 into the upper end of the stripper-gasifier vessel 17. The particulates are fluidized in the vessel 17 by upwardly flowing gases including steam. Volatile hydrocarbons are stripped off the particulate solids and are removed along with the fluidizing gases. The gases are removed from the upper end of the vessel through the conduit 27 and recovered. Particulates containing about 2 weight percent coke are removed from the bottom of the vessel 17 and are passed through the line 35 into the first regeneration zone in the transfer vessel 37. The particulates are entrained upwardly through the vessel 37 at a solids residence time of about 3 seconds. Enough molecular oxygen is introduced into the vessel to react with coke on the particles sufficiently to reduce the coke concentration to about 1 weight percent in particles removed from the upper end of the vessel 37. The partially regenerated particles and the entraining gas are removed from the vessel 37 and separated in the cyclone 43. The entraining gas is removed through the conduit 45. It contains 2 volume percent molecular oxygen and has a $CO_2/CO$ volume ratio of 2. This gas stream is suitable for use as a low grade industrial fuel gas. The partially regenerated catalyst is introduced into the upper end of the second regeneration zone in the vessel 49. The particles are fluidized, but not entrained, by upwardly flowing gases including molecular oxygen. Gross back-mixing of solids in the vessel 49 is impeded by the use of iinternals such as the screens 51 in the vessel 49. The average residence time of solids in the vessel 49 is about 30 seconds. Sufficient molecular oxygen is introduced into the lower end of the vessel 49 in the fluidizing gases to react with substantially all the coke on the particles in the vessel 49. Regenerated particles removed from bottom of the vessel contain only about 0.1 weight percent carbon. The fluidizing gases are removed from the top end of the vessel through the conduit 55, the effluent gas contains about 4 volume percent molecular oxygen and has a $CO_2/CO$ volume ratio of about 3.

A preferred embodiment of the invention having been described, a large number of equivalents, variations and modifications of the invention will be apparent to those skilled in the art. Such equivalents, variations and modifications are within the scope of the invention as defined in the appended claims.

What is claimed is:

1. A process for cracking hydrocarbons, which comprises:
   (a) contacting said hydrocarbons with particulate solid in a cracking zone in the absence of externally supplied molecular hydrogen at cracking conditions including a temperature in the range from about 425° C. to about 700° C., whereby coke is deposited on said particulate solids, and withdrawing coke containing particulate solids and cracked hydrocarbons from said cracking zone;
   (b) introducing coke-containing particulate solids into a lower portion of a generally vertically extending first regeneration zone, passing coke-containing particulate solids upwardly through said first regeneration zone entrained in upwardly flowing gases, burning a first portion of coke off entrained particulate solids with molecular oxygen, and removing particulate solids from an upper portion of said first regeneration zone; and
   (c) passing particulate solids removed from said first regeneration zone into an upper portion of a generally vertically extending second regeneration zone, fluidizing particulate solids in said second regeneration zone in upwardly flowing gases, passing fluidized particulate solids generally downwardly through said second regeneration zone while substantially restricting gross back-mixing of fluidized particulate solids, burning a second portion of coke off fluidized particulate solids with molecular oxygen, and removing particulate solids from a lower portion of said second regeneration zone.

2. A process according to claim 1 wherein molecular oxygen is introduced into said first regeneration zone at a plurality of vertically spaced levels.

3. A process according to claim 1 wherein a residual petroleum fraction is contacted with said particulate solids in said cracking zone.

* * * * *